(12) United States Patent
Kikkawa

(10) Patent No.: US 12,449,784 B2
(45) Date of Patent: Oct. 21, 2025

(54) NUMERICAL CONTROL DEVICE, NUMERICAL CONTROL SYSTEM, PROGRAM, AND NUMERICAL CONTROL METHOD

(71) Applicant: FANUC CORPORATION, Yamanashi (JP)

(72) Inventor: Daiki Kikkawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 392 days.

(21) Appl. No.: 18/248,614

(22) PCT Filed: Oct. 26, 2021

(86) PCT No.: PCT/JP2021/039552
§ 371 (c)(1),
(2) Date: Apr. 11, 2023

(87) PCT Pub. No.: WO2022/092115
PCT Pub. Date: May 5, 2022

(65) Prior Publication Data
US 2023/0384754 A1     Nov. 30, 2023

(30) Foreign Application Priority Data
Nov. 2, 2020   (JP) .................................. 2020-183694

(51) Int. Cl.
*G05B 19/401* (2006.01)
*B23Q 15/12* (2006.01)

(52) U.S. Cl.
CPC .......... *G05B 19/401* (2013.01); *B23Q 15/12* (2013.01); *G05B 2219/37425* (2013.01)

(58) Field of Classification Search
None
See application file for complete search history.

(56) References Cited

U.S. PATENT DOCUMENTS

2020/0012253 A1*  1/2020  Kimata ................ G05B 13/048
2023/0288900 A1*  9/2023  Kikkawa .............. B23K 26/048

FOREIGN PATENT DOCUMENTS

| CN | 109088570 A | 12/2018 |
|---|---|---|
| CN | 110626342 A | 12/2019 |
| JP | H05-253804 A | 10/1993 |
| JP | H09-308979 A | 12/1997 |

(Continued)

OTHER PUBLICATIONS

International Search Report issued in PCT/JP2021/039552; mailed Jan. 25, 2022.

*Primary Examiner* — Ryan A Jarrett
(74) *Attorney, Agent, or Firm* — Studebaker Brackett PLLC

(57) ABSTRACT

This numerical control device comprises a distance control unit, a filter unit, a determination unit, and a setting unit. The distance control unit controls the distance between a first object and a second object to be close to a target distance. The filter unit filters a signal indicating the distance. The determination unit determines, on the basis of the target distance, a time constant obtained from the relationship between the distance and an output signal from a distance sensor that measures the distance. The setting unit sets a time constant of the filter to the time constant determined by the determination unit.

6 Claims, 5 Drawing Sheets

(56) References Cited

FOREIGN PATENT DOCUMENTS

| | | | |
|---|---|---|---|
| JP | 2006-122939 | A | 5/2006 |
| JP | 2009-255642 | A | 11/2009 |
| JP | 2010-076536 | A | 4/2010 |

* cited by examiner

NUMERICAL CONTROL DEVICE, NUMERICAL CONTROL SYSTEM, PROGRAM, AND NUMERICAL CONTROL METHOD

TECHNICAL FIELD

The present invention relates to a numerical control device, a numerical control system, a program, and a numerical control method.

BACKGROUND ART

A numerical control device measures the distance to an object, such as a surface of a machining target (workpiece), using a gap sensor or the like, in some cases. Since output-distance characteristics of a gap sensor are nonlinear, a variation (slope) in output with respect to a change in distance depends on the distance. Therefore, in a distance region where the slope of characteristics is large, when there is a change in the output value of the gap sensor, the distance converted from the output value also changes greatly. For these reasons, distance measurement in such a distance region is susceptible to influence of a disturbance component (noise) or the like. If the numerical control device controls a machine using a measured value affected by such noise, there will be a possibility of causing vibrations or the like in the machine.

Patent Document 1: Japanese Unexamined Patent Application, Publication No. H5-253804

DISCLOSURE OF THE INVENTION

Problems to be Solved by the Invention

Embodiments of the present invention are to provide a numerical control device, a numerical control system, a program and a numerical control method that can prevent the influence of noise in distance measurement.

Means for Solving the Problems

A numerical control device of an embodiment includes a distance control unit, a filter unit, a determination unit and a setting unit. The distance control unit performs control to cause a distance between a first object and a second object to approach a target distance. The filter unit applies a signal indicating the distance to a filter. The determination unit determines a time constant based on the target distance, the time constant being obtained from a relationship between the distance and an output signal of a distance sensor that measures the distance. The setting unit sets a time constant of the filter to the time constant determined by the determination unit.

Effects of the Invention

According to an aspect, the influence of noise can be prevented in distance measurement.

PREFERRED MODE FOR CARRYING OUT THE INVENTION

Hereinafter, numerical control systems according to embodiments are described with reference to the drawings. Note that in each drawing used to describe the following embodiments, the scale of each component is appropriately changed in some cases. In each drawing used to describe the following embodiments, components are omitted for the sake of description in some cases. In each drawing and in this Description, the same symbols indicate similar elements.

FIRST EMBODIMENT

Figure 1:
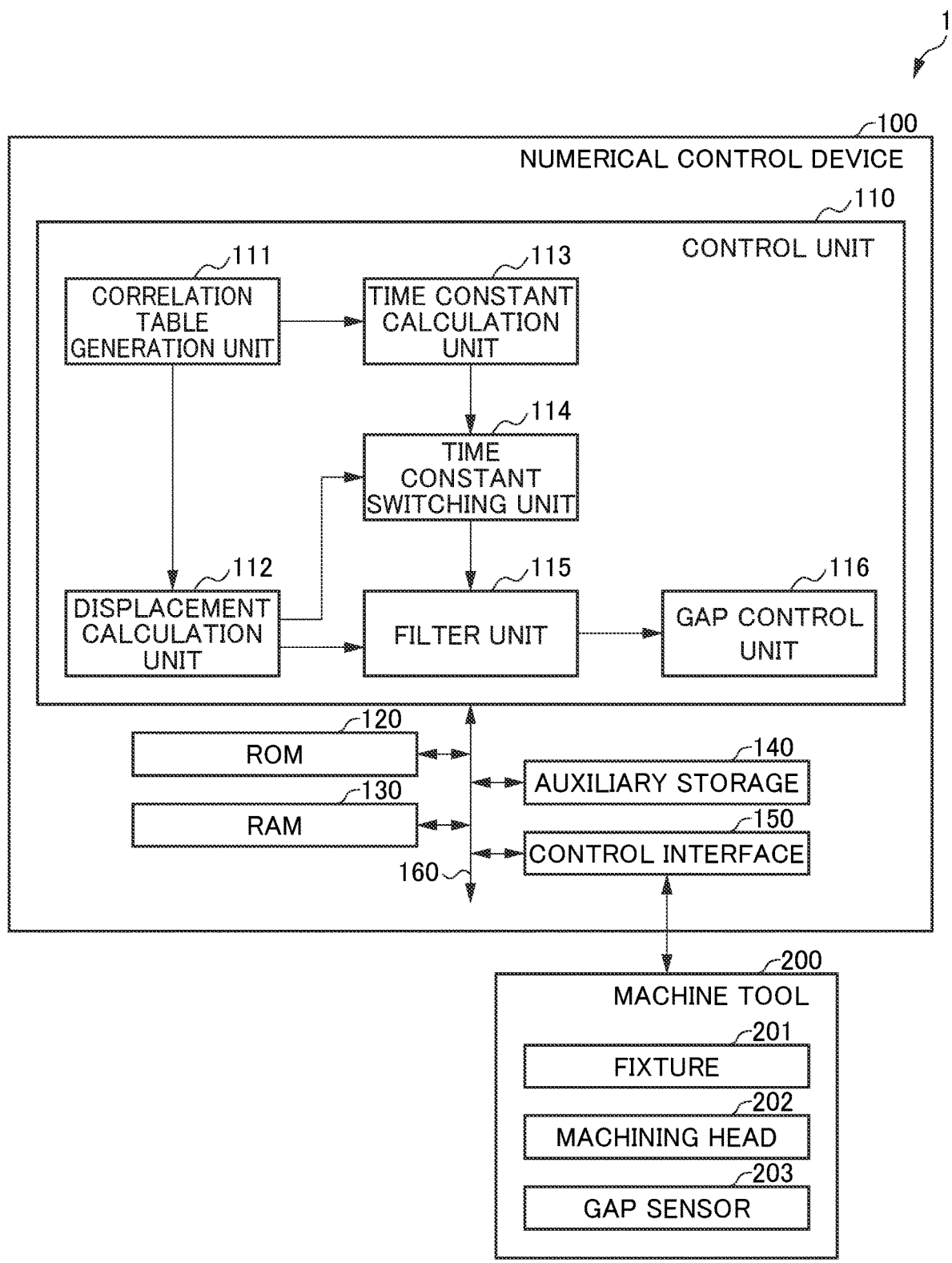
FIG. 1 is a block diagram showing major configurations of a numerical control system according to an embodiment and components included in the numerical control system.

FIG. 1 is a block diagram showing an example of major configurations of a numerical control system 1 according to a first embodiment and components included in the numerical control system 1. The numerical control system 1 is a system in which a numerical control device 100 performs CNC (computerized numerical control) for a machine tool 200 or the like. The numerical control system 1 includes, for example, the numerical control device 100, a gap sensor 203 and the machine tool 200.

The numerical control device 100 is a device that performs CNC for the machine tool 200 or the like. The numerical control device 100 includes, for example, a control unit 110, a ROM (read-only memory) 120, a RAM (random-access memory) 130, an auxiliary storage 140 and a control interface 150. A bus 160 and the like connect these components.

The control unit 110 corresponds to a center portion of a computer that performs computation, control and the like required for operations of the numerical control device 100. The control unit 110 is, for example, a CPU (central processing unit), an MPU (micro processing unit), an SoC (system on a chip), a DSP (digital signal processor), a GPU (graphics processing unit), an ASIC (application specific integrated circuit), a PLD (programmable logic device), or an FPGA (field-programmable gate array) or the like. Alternatively, the control unit 110 is a combination of items among these components. The control unit 110 controls each component in order to achieve various functions of the numerical control device 100, based on programs, such as firmware, system software and application software, stored in the ROM 120 or the auxiliary storage 140 or the like. The control unit 110 executes processes described later, based on the programs. The control unit 110 functions as, for example, a correlation table generation unit 111, a displacement calculation unit 112, a time constant calculation unit 113, a time constant switching unit 114, a filter unit 115 and a gap control unit 116, based on the programs. These components are described later. Note that some of or all the programs may be implemented in a circuit of the control unit 110.

The ROM 120 corresponds to a main storage of the computer centered at the control unit 110. The ROM 120 is a nonvolatile memory used for reading data in a dedicated manner. The ROM 120 stores, for example, firmware and the like among the programs described above. The ROM 120 stores data and the like that the control unit 110 uses to perform various processes.

The RAM 130 corresponds to a main storage of the computer centered at the control unit 110. The RAM 130 is a memory used to read and write data. The RAM 130 is used as a work area and the like that temporarily store the data that the control unit 110 uses to perform various processes. Typically, the RAM 130 is a volatile memory.

The auxiliary storage 140 corresponds to an auxiliary storage of the computer centered at the control unit 110. The auxiliary storage 140 is, for example, an EEPROM (electric erasable programmable read-only memory), an HDD (hard disk drive), or a flash memory or the like. The auxiliary storage 140 stores, for example, the system software, and the application software and the like, among the programs described above. The auxiliary storage 140 stores the data that the control unit 110 uses to perform various processes, data generated by processes by the control unit 110, and various setting values and the like.

The control interface 150 is an interface for allowing the numerical control device 100 to communicate with each device. The numerical control device 100 controls a machining device 300 via the control interface 150. The numerical control device 100 receives an input of a signal output by the gap sensor 203 (hereinafter, called a "sensor signal") via the control interface 150. Note that the sensor signal is, for example, a data signal or the like that indicates the voltage or a value of the voltage. Alternatively, the sensor signal may be a data signal or the like that indicates the current or a value indicating the current.

The bus 160 includes a control bus, an address bus and a data bus or the like, and transfers signals transmitted and received by the components of the numerical control device 100.

The machine tool 200 is, for example, a device that performs machining, such as laser machining or cutting machining, for a workpiece W, based on control by the numerical control device 100. The machine tool 200 includes, for example, a fixture 201, a machining head 202 and a gap sensor 203.

The fixture 201 is a device that fixes the workpiece W. The machining head 202 includes, for example, a tool and the like for performing machining for the workpiece W. The gap sensor 203 is attached to the machining head 202.

The machine tool 200 has a function of changing the distance between the workpiece W and the machining head 202, based on control by the numerical control device 100. Here, the machine tool 200 changes the distance between the workpiece W and the machining head 202 by moving at least any of the fixture 201 and the machining head 202. Note that the workpiece W is an example of a first object. The machining head 202 or the gap sensor 203 is an example of a second object.

The gap sensor 203 is a sensor for measuring the distance (amount of gap) from the gap sensor 203 or the machining head 202 to the workpiece W. Alternatively, the gap sensor 203 is a sensor for measuring the distance (displacement) from the gap sensor 203 or the machining head 202 to a reference position. Here, the reference position is a position apart from a surface of the workpiece W by a predetermined distance h. Accordingly, the displacement has a relationship of displacement=(amount of gap−h). Hereinafter, description is made using an example of performing each of the processes using the displacement. Alternatively, an exemplary embodiment where the numerical control system 1 performs similar processes using the amount of gap may be adopted. The magnitude of the sensor signal output from the gap sensor 203 changes depending on the displacement. For example, the magnitude of the sensor signal increases with increase in displacement. The sensor signal is input into the numerical control device 100 via the control interface 150. An object about which the gap sensor 203 measures the distance is, for example, the surface of the workpiece W. For example, a distance sensor of various types that is eddy-current, capacitance, optical such as laser, and ultrasonic may be adopted as the gap sensor 203.

Figure 2:
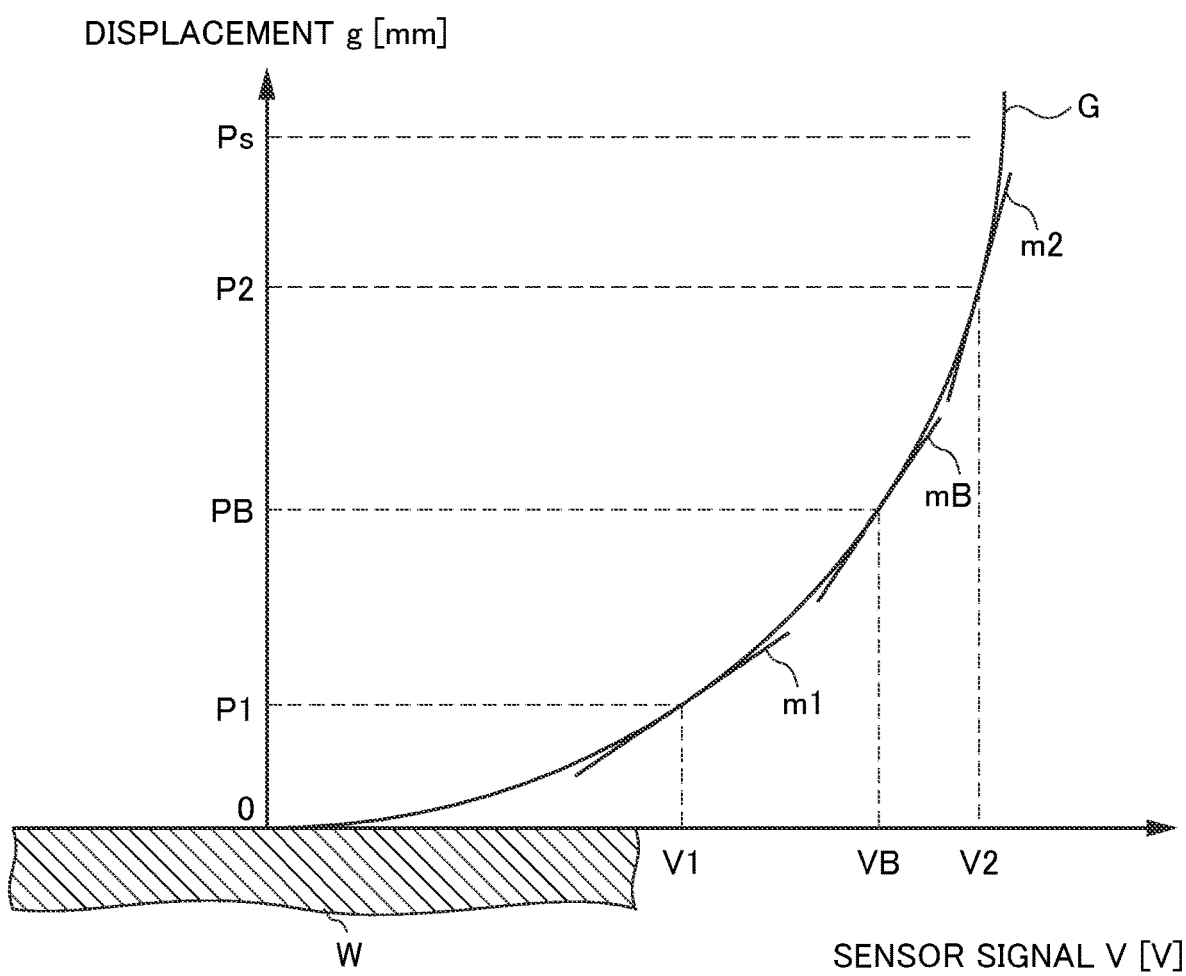
FIG. 2 shows an example of sensor signal-displacement characteristics of a gap sensor.

Referring to FIG. 2, the characteristics of the gap sensor 203 are described. FIG. 2 shows an example of sensor signal-displacement characteristics of the gap sensor 203. In a graph shown in FIG. 2, the ordinate axis indicates the displacement g [mm] and the abscissa axis indicates the sensor signal V [V (volt)]. Note that the workpiece W shown in FIG. 2 may be illustrated in a partially omitted manner. The shape of the workpiece W shown in FIG. 2 is an example. The gap sensor 203 indicates nonlinear characteristics as indicated by a graph G, for example. As for the displacement P1 of the gap sensor 203, the ratio (slope) of the variation in displacement to the variation in sensor signal is a slope m1. The slope of the displacement P2 of the gap sensor 203 is a slope m2. Here, P1>P2 and m1>m2. As described above, in the graph G, the slope m increases with increase in displacement. That is, in the gap sensor 203, the ratio of the variation in sensor signal to the variation in displacement increases with increase in displacement. In FIG. 2, the sensor signal V at the displacement P1 is indicated as V1. The sensor signal V at the displacement P2 is indicated as V2.

The correlation table generation unit 111, the displacement calculation unit 112, the time constant calculation unit 113, the time constant switching unit 114, the filter unit 115 and the gap control unit 116, which are functions of the control unit 110, are described. The correlation table generation unit 111 preliminarily generates a correlation table T that indicates the relationship between the sensor signal and the displacement. The correlation table T indicates, for example, the relationship as shown in FIG. 2, in a table format. The correlation table generation unit 111 stores the generated correlation table T in the auxiliary storage 140 or the like. Note that the control unit 110 is not necessarily generate the correlation table T by the correlation table generation unit 111 and may store a correlation table generated outside of the numerical control device 100, in the auxiliary storage 140 or the like. Note that the correlation table generation unit 111 may generate a function that indicates the relationship between the sensor signal and the displacement, instead of the correlation table T. The auxiliary storage 140 may store the function instead of the correlation table T.

The displacement calculation unit 112 performs calculation of obtaining the displacement using the sensor signal input from the gap sensor 203 into the displacement calculation unit 112. That is, the displacement calculation unit 112 converts the sensor signal input into this displacement calculation unit 112, into the displacement, using the correlation table generation unit 111. The displacement calculation unit 112 outputs the obtained displacement as a signal. Note that the sensor signal is sequentially input into the numerical control device 100 at predetermined times, for example. The displacement calculation unit 112 converts part or the entire signal into the displacement and outputs the displacement. Note that the displacement calculation unit 112 is an example of a conversion unit that converts the sensor signal into a signal indicating the displacement. The sensor signal is an example of the first signal that changes depending on the distance. The signal indicating the displacement is an example of a second signal indicating the distance.

The time constant calculation unit 113 obtains the time constant of a first-order lag filter (low-pass filter) that the filter unit 115 includes, based on a target displacement (target distance) or the like. Note that the target displacement is a target value of the displacement during the approach. The numerical control device 100 performs control of causing the displacement to approach the target displacement. The time constant calculation unit 113 outputs a signal indicating the obtained time constant. Note that the time constant calculation unit 113 is an example of a determination unit that determines a time constant of the first-order lag filter based on the target displacement.

The time constant switching unit 114 sets (switches) the time constant of the first-order lag filter that the filter unit 115 includes, to the value of the time constant obtained by the time constant calculation unit 113. Note that the time constant switching unit 114 is an example of a setting unit that sets the time constant of the first-order lag filter to the time constant determined by the time constant calculation unit 113.

The filter unit 115 includes a first-order lag filter. The filter unit 115 inputs the displacement output from the displacement calculation unit 112 into the first-order lag filter. Accordingly, the filter unit 115 removes noise and other components having a higher frequency than the cutoff frequency of the first-order lag filter from the displacement. The filter unit 115 outputs the displacement signal output from the first-order lag filter. Typically, the output of the filter is a filter output=(filter output last time+(target value−filter output last time)×control frequency/time constant).

The gap control unit 116 controls the machine tool 200 so that the displacement approach the target displacement, based on the displacement output from the filter unit 115, thus controlling the machining head 202 and others. Note that the gap control unit 116 is an example of a distance control unit.

Figure 3:
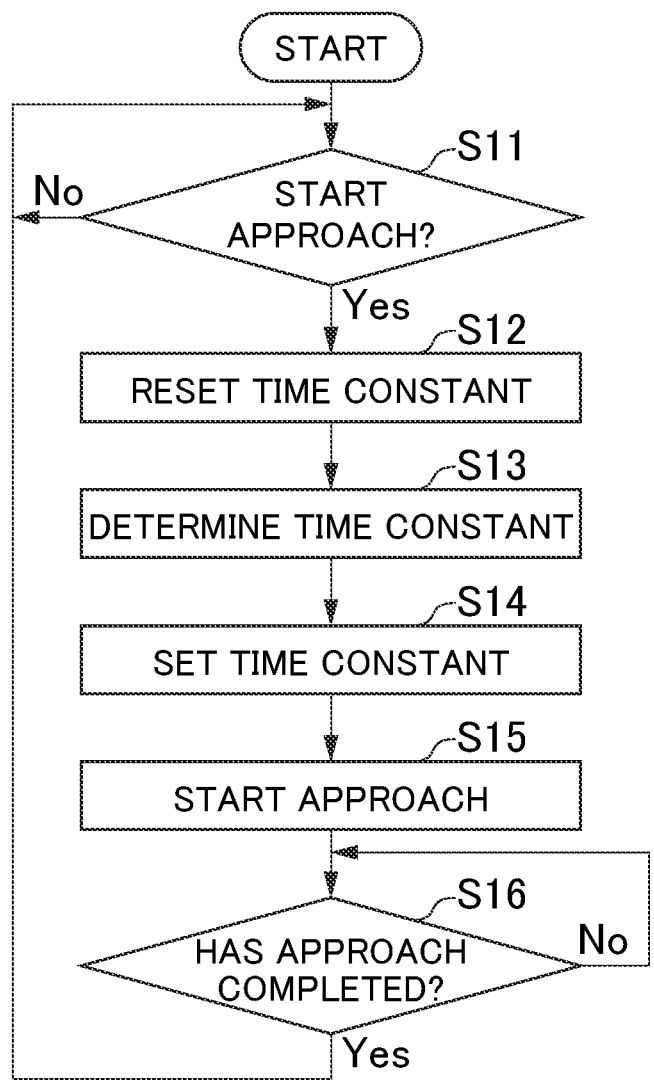
FIG. 3 is a flowchart showing an example of processes by a control unit in FIG. 1 according to a first embodiment.

Hereinafter, operations of the numerical control system 1 according to the first embodiment are described with reference to FIG. 3 and others. Note that the details of the processes of the description of the operations described below are only an example. Various processes that can obtain similar results can be appropriately used. FIG. 3 is a flowchart showing an example of processes by the control unit 110 of the numerical control device 100. The control unit 110 executes the processes in FIG. 3 based on the programs stored in the ROM 120 or the auxiliary storage 140 or the like, for example.

In Step S11 in FIG. 3, the control unit 110 determines whether to start the approach or not. If the control unit 110 does not determine to start the approach, this unit determines No in Step S11 and repeats Step S11. Note that the approach is change in distance between the machining head 202 and the workpiece W to thereby cause the displacement to approach the target displacement. For example, upon input of instruction information indicating the start of approach, the control unit 110 determines to start the approach. The input is an input from another process executed by the control unit 110, for example. Alternatively, the instruction information may be input from another device into the numerical control device 100. The instruction information includes, for example, a target displacement P. If the control unit 110 determines to start the approach, this unit determines Yes in Step S11 and proceeds the processing to Step S12.

In Step S12, the control unit 110 resets the time constant of the first-order lag filter. That is, the time constant switching unit 114 sets the time constant of the first-order lag filter of the filter unit 115 to a reference time constant $\tau B$.

In Step S13, the control unit 110 determines the time constant $\tau$, based on the target displacement P included in the instruction information. That is, the time constant calculation unit 113 obtains the time constant $\tau$ suitable for the slope m corresponding to the target displacement P. For example, when the target displacement is P1 in FIG. 2, the time constant calculation unit 113 obtains a time constant $\tau 1$ suitable for the slope m1 corresponding to a target displacement P1. When the target displacement is P2, the time constant calculation unit 113 obtains a time constant $\tau 2$ suitable for the slope m2 corresponding to a target displacement P2. Note that representation of the slope m as an equation is m=dg/dV.

Note that the auxiliary storage 140 or the like of the numerical control device 100 stores a reference displacement PB and a reference time constant $\tau B$, which are predefined. The reference displacement PB and the reference time constant $\tau B$ are a displacement and a time constant, which serve as references for obtaining the time constant $\tau 1$. Although the reference displacement PB may be any value, it is preferable that the reference displacement PB be a value often set as the target displacement. The reference time constant $\tau B$ is a time constant suitable for the reference slope mB corresponding to the reference displacement. In FIG. 2, the sensor signal V at the reference displacement PB is indicated as VB.

The time constant calculation unit 113 obtains the time constant $\tau$ suitable for the slope m corresponding to the target displacement P, according to the following equation, for example.

$$\tau = (m/mB) \times \tau B \tag{1}$$

For example, the time constant $\tau 1$ in a case where the approach start point is a displacement Ps and the target displacement is the displacement P1 is given by $\tau 1=(m1/mB) \times \tau B$. For example, the time constant $\tau 2$ in a case where the approach start point is a displacement Ps and the target displacement is the displacement P2 is given by $\tau 2=(m2/mB) \times \tau B$. For example, the time constant $\tau 2$ in a case where the approach start point is a displacement P1 and the target displacement is the displacement P2 is given by $\tau 2=(m2/mB) \times \tau B$. As described above, the time constant $\tau$ changes depending on the target displacement, and has the same value irrespective of difference in the start point. For example, it is assumed that $\tau B$ is 16 milliseconds, mB is 2n, m1 is n and m2 is 4n. Note that n is a positive number. In this case, $\tau 1=(n/2n) \times 16$ (milliseconds)=8 (milliseconds) and $\tau 2=(4n/2n) \times 16$ (milliseconds)=32 (milliseconds). As described above, at x times the slope m, the time constant $\tau$ becomes x times accordingly. The slope m and the time constant $\tau$ are proportional to each other.

Note that the time constant calculation unit 113 may obtain the time constant $\tau$ from the target displacement P using a table or the like indicating the relationship between the target displacement P and the time constant $\tau$, without using the equation (1) described above. The table can be generated by preliminarily obtaining the time constant $\tau$ for each of multiple target displacements P. The table is stored in the auxiliary storage 140 or the like, for example.

In Step S14, the time constant switching unit 114 of the control unit 110 sets the time constant of the first-order lag filter to the time constant τ obtained in Step S13.

In Step S15, the control unit 110 controls the machine tool 200 to start the approach. That is, the displacement calculation unit 112 obtains the displacement from the sensor signal. The filter unit 115 then inputs the displacement into the first-order lag filter and removes noise. Furthermore, the gap control unit 116 compares the noise-removed displacement with the target displacement. If the displacement is larger than the target displacement, this unit controls the machining device 300 so as to reduce the distance between the machining head 202 and the workpiece W. Based on the control, the machining device 300 reduces the distance between the machining head 202 and the workpiece W. On the other hand, when the displacement is smaller than the target displacement, the gap control unit 116 controls the machining device 300 so as to increase the distance between the machining head 202 and the workpiece W. Based on the control, the machining device 300 increases the distance between the machining head 202 and the workpiece W. The displacement calculation unit 112, the filter unit 115 and the gap control unit 116 continue the processes described above until the displacement becomes equal to the target displacement. Here, the displacement becomes equal to the target displacement indicates that the displacement falls into a predetermined error range with reference to the target displacement.

In Step S16, the control unit 110 waits for completion of the approach. When the displacement becomes equal to the target displacement, the control unit 110 determines that the approach is completed. If the control unit 110 determines that the approach is completed, this unit determines Yes in Step S16 and returns the processing to Step S11.

According to the numerical control system 1 in the first embodiment, the numerical control device 100 uses the time constant depending on the target displacement at every approach. Accordingly, the numerical control device 100 in the first embodiment can reduce the influence of noise during measurement of the displacement even in the displacement region with a large slope m.

According to the numerical control system 1 in the first embodiment, the numerical control device 100 uses the time constant proportional to the slope m. Accordingly, the numerical control device 100 according to the first embodiment can make the influence of noise substantially equal irrespective of the slope m for the target displacement.

SECOND EMBODIMENT

Figure 4:
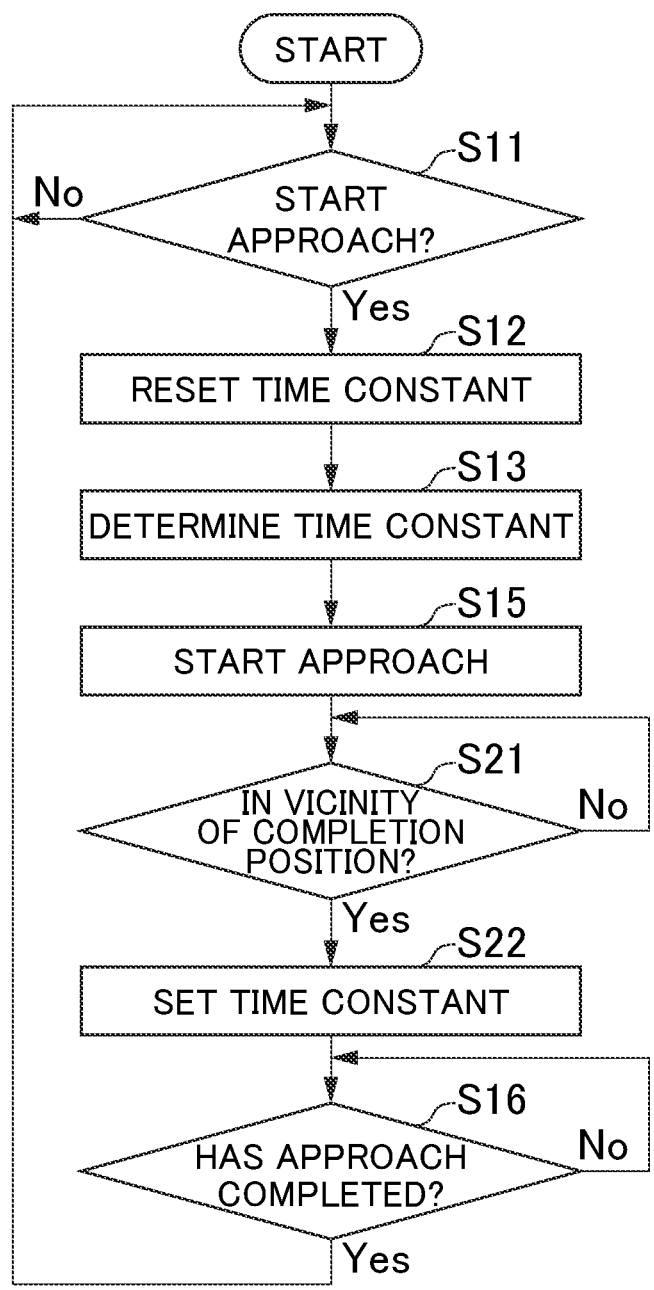
FIG. 4 is a flowchart showing an example of processes by a control unit in FIG. 1 according to a second embodiment.

The configuration of the numerical control system 1 in a second embodiment is similar to that of the first embodiment. Accordingly, the description is omitted. Hereinafter, operations of the numerical control system 1 according to the second embodiment are described with reference to FIG. 4 and others. The control unit 110 of the numerical control device 100 in the second embodiment performs processes in FIG. 4 instead of those in FIG. 3. FIG. 4 is a flowchart showing an example of processes by the control unit 110 of the numerical control device 100. The control unit 110 executes the processes in FIG. 4 based on the programs stored in the ROM 120 or the auxiliary storage 140 or the like, for example.

In the second embodiment, the control unit 110 performs the process in Step S13 in FIG. 4 and then proceeds the processing to Step S15. In this way, the control unit 110 does not perform the process in Step S14. Accordingly, the time constant of the first-order lag filter of the filter unit 115 at the approach start time point is the reference time constant τB set in Step S12.

In the second embodiment, the control unit 110 performs the process in Step S15 and then proceeds the processing to Step S21. In Step S21, the control unit 110 waits for the displacement reaching the vicinity of the target displacement. For example, the control unit 110 determines that the displacement reaches the vicinity of the target displacement using any of the following methods (A) to (C).

Figure 5:
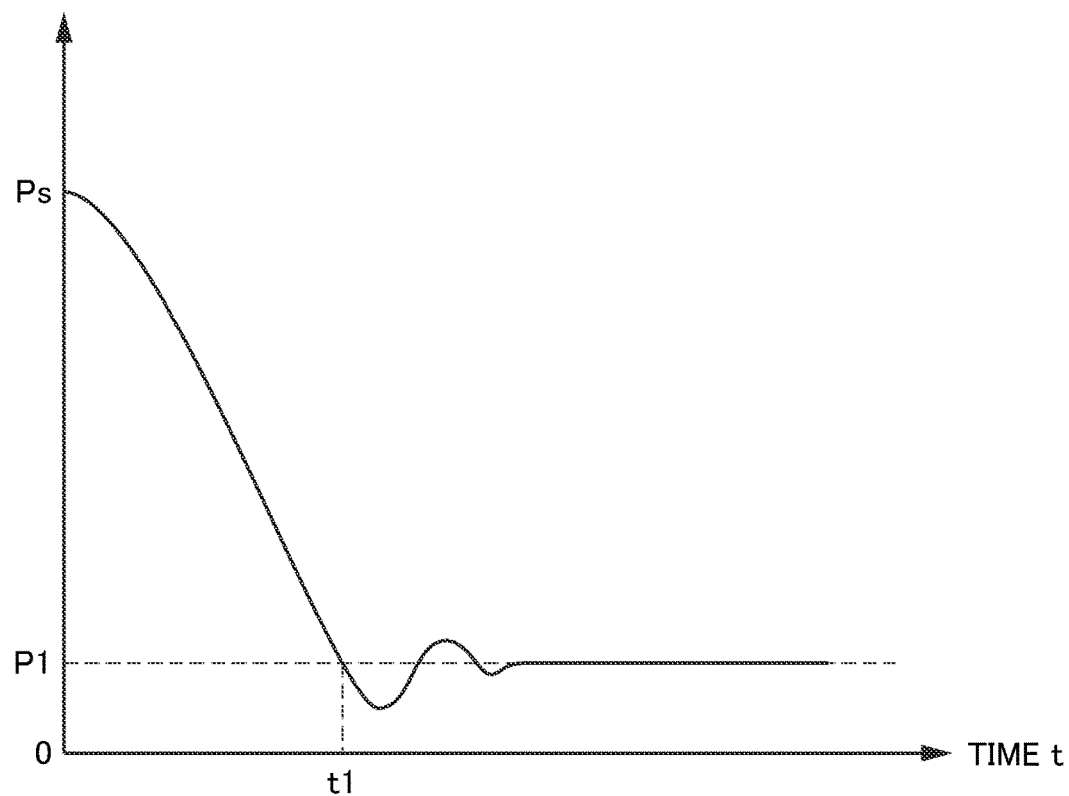
FIG. 5 shows an example of temporal change in displacement.

(A) When the sign of the difference d between the target displacement and the displacement indicating positive or negative is inverted, the control unit 110 determines that the displacement reaches the vicinity of the target displacement. During the approach, the displacement approaches the target displacement in accordance with change as shown in FIG. 5, for example. FIG. 5 shows an example of temporal change in displacement. Note that for example, FIG. 5 shows the temporal change in displacement g in a case where the start point is a displacement Ps and the target displacement is P1. The control unit 110 accelerates the machining head so that the displacement g approach the target displacement P1. When the displacement g approaches the target displacement P1, the control unit 110 then decelerates the machining head. At this time, the displacement g overshoots the target displacement P1. That is, the sign of the difference d is inverted. Note that the difference d can be represented as d=g−P1, for example. Note that the time when the sign of the difference d is inverted is assumed as t1. The inversion of the sign of the difference d is that the machining head 202 overshoots the target displacement. Accordingly, when the sign of the difference d is inverted, the control unit 110 can assume that the displacement reaches the vicinity of the target displacement. Even thereafter as shown in FIG. 5, until the displacement g becomes equal to the target displacement P1, the control unit 110 causes the displacement g to approach the target displacement P1 while inverting the sign of the difference d several times, i.e., inverting the direction in which the machining head advances several times.

(B) When the change rate in the displacement becomes equal to or less than a predetermined threshold TH1, the control unit 110 determines that the displacement reaches the vicinity of the target displacement. When the displacement reaches the target displacement, the control unit 110 performs control of decelerating the change rate in the displacement so that the machining head 202 does not overshoot the target displacement. Accordingly, when the change rate in the displacement becomes the predetermined threshold or less, the control unit 110 can assume that the displacement reaches the vicinity of the target displacement. Note that for example, the threshold TH1 is predetermined by a designer or a manager or the like of the numerical control device 100.

(C) When the absolute value of the difference between the displacement and the target displacement becomes equal to or less than a predetermined threshold TH2, the control unit 110 determines that the displacement reaches the vicinity of the target displacement. Note that for example, the threshold TH2 is predetermined by the designer or the manager or the like of the numerical control device 100.

If the control unit 110 determines that the displacement reaches the vicinity of the target displacement, this unit determines Yes in Step S21 and proceeds the processing to Step S22.

In Step S22, the control unit 110 changes the time constant of the first-order lag filter to the time constant t obtained in Step S13. That is, the time constant switching unit 114 sets the time constant of the first-order lag filter of the filter unit 115 to the time constant t obtained in Step S13. After the process in Step S22, the control unit 110 proceeds the processing to Step S16.

If the control unit 110 determines Yes in Step S16, the processing returns to Step S11.

An example of using the method (A) in Step S21 is adopted, and it is described how the time constant is changed by the processes described above. Note that it is herein assumed that the start point is the displacement Ps and the target displacement is P1. Until the sign of the difference d is inverted, i.e., from a time 0 to a time t1, the control unit 110 causes the value of the time constant τ to be the time constant τB. When the sign of the difference d is inverted, i.e., at the time t1, the control unit 110 then switches the value of the time constant τ to the time constant τ1. Until completion of the approach, the control unit 110 causes the time constant τ to be the time constant τ1.

The numerical control system 1 in the second embodiment can achieve advantageous effects similar to those in the first embodiment.

According to the numerical control system 1 in the second embodiment, when the numerical control device 100 determines that the displacement reaches the vicinity of the target displacement, this unit changes the time constant of the first-order lag filter to the time constant determined in Step S13. Consequently, the numerical control device 100 in the second embodiment can prevent reduction in responsiveness due to increase in time constant at displacements out of the vicinity of the target displacement and prevent overshoot by the reduction.

The first embodiment and the second embodiment described above can be modified as follows. The filter that the filter unit 115 includes is not limited to the first-order lag filter. The filter unit 115 may include, for example, a high-pass filter, a band-pass filter or a band-stop filter.

In the embodiments described above, the control unit 110 converts the sensor signal into the displacement. However, the gap sensor 203 may convert the sensor signal into a signal indicating the distance, such as the displacement, and output the signal. In this case, the gap sensor 203 functions as an example of the conversion unit.

In the second embodiment described above, the numerical control device 100 changes the time constant once by completion of the approach after start of the approach. However, the numerical control device 100 may change the time constant multiple times.

The control unit 110 may be what achieves some of or all the processes achieved by the program in the embodiments described above, through a hardware configuration of a circuit.

The programs that achieve the processes in the embodiments are assigned in a state of being stored in a device, for example. However, the device may be assigned in a state where the program is not stored. The programs may then be assigned separately, and be written in the device. Assigning of the programs in this case can be achieved by storage in a removable storage device or download via a network, such as the Internet or a LAN (local area network), for example.

The embodiments of the present invention are thus described above but are described as examples and do not limit the scope of the present invention. The embodiments of the present invention can be implemented in various aspects in a range without departing from the gist of the present invention.

EXPLANATION OF REFERENCE NUMERALS

1: Numerical control system
100: Numerical control device
110: Control unit
111: Correlation table generation unit
112: Displacement calculation unit
113: Time constant calculation unit
114: Time constant switching unit
115: Filter unit
116: Gap control unit
120: ROM
130: RAM
140: Auxiliary storage
150: Control interface
160: Bus
200: Machine tool
201: Fixture
202: Machining head
203: Gap sensor

The invention claimed is:

1. A numerical control device, comprising:
a distance control unit configured to perform control to cause a distance between a first object and a second object to approach a target distance;
a filter unit configured to apply a signal indicating the distance to a filter;
a determination unit configured to determine a time constant based on the target distance, the time constant being obtained from a relationship between the distance and an output signal of a distance sensor that measures the distance; and
a setting unit configured to set a time constant of the filter to the time constant determined by the determination unit.

2. The numerical control device according to claim 1, further comprising:
a correlation table generation unit configured to generate a correlation table that indicates the relationship; and
a displacement calculation unit configured to calculate the distance, based on the output signal and the correlation table,
wherein the determination unit determines the time constant by calculating the time constant based on the relationship and the target distance.

3. The numerical control device according to claim 1, wherein
when a sign of a difference between the distance and the target distance is inverted, when the difference becomes smaller than a predetermined difference or when a rate of reduction in the distance becomes smaller than a predetermined rate, the setting unit sets the time constant of the filter to the time constant determined by the determination unit.

4. A numerical control system comprising a distance sensor and a numerical control device,
the distance sensor being configured to output a first signal that changes in accordance with a distance between a first object and a second object,
the numerical control system comprising a conversion unit that converts the first signal into a second signal indicating the distance,
the numerical control device comprising:
a distance control unit that performs control to cause the distance to approach a target distance;
a filter unit that applies the second signal to a filter;

a determination unit that determines a time constant based on the target distance, the time constant being obtained from a relationship between the first signal and the distance; and a setting unit that sets a time constant of the filter to the time constant determined by the determination unit.

5. A non-transitory computer readable medium storing therein a program for causing a processor included in a numerical control device to function as units comprising:

a control unit that performs control to cause a distance between a first object and a second object to approach a target distance;

a filter unit that applies a signal indicating the distance to a filter;

a determination unit that determines a time constant based on the target distance, the time constant being obtained from a relationship between the distance and an output signal of a distance sensor that measures the distance; and a setting unit that sets a time constant of the filter to the time constant determined by the determination unit.

6. A numerical control method, comprising:

performing control to cause a distance between a first object and a second object to approach a target distance;

setting a time constant of a filter to the time constant determined based on a relationship between the distance and an output signal of a distance sensor that measures the distance and the target distance; and applying a filter to a signal that indicates the distance.

* * * * *